United States Patent [19]

Beck

[11] 4,173,559
[45] * Nov. 6, 1979

[54] NON-AQUEOUS POLYMERIC DISPERSION OF ALKYL METHACRYLATE AND ALKYL ACRYLATE COPOLYMERS IN MIXTURES OF CYCLOHEXANE AND ALCOHOLS AND MATTE COATINGS PRODUCED THEREFROM

[75] Inventor: Charles K. Beck, Mentor, Ohio

[73] Assignee: AM International, Inc., Los Angeles, Calif.

[*] Notice: The portion of the term of this patent subsequent to Apr. 25, 1995, has been disclaimed.

[21] Appl. No.: 811,524

[22] Filed: Jun. 30, 1977

[51] Int. Cl.$^2$ ............... C08F 2/14; C08L 33/08
[52] U.S. Cl. ............... 260/33.4 R; 260/34.2; 428/463
[58] Field of Search ............... 260/33.4 R, 34.2

[56] References Cited

U.S. PATENT DOCUMENTS

| | | | |
|---|---|---|---|
| 2,934,510 | 4/1960 | Grissey | 260/33.4 R |
| 2,940,950 | 6/1960 | Gusman | 260/33.4 R |
| 3,691,123 | 9/1972 | Clarke | 260/33.4 R |
| 3,740,367 | 6/1973 | Winkelbleck | 260/33.4 R |
| 3,764,587 | 10/1973 | Tunker | 260/33.4 R |
| 3,823,205 | 7/1974 | Zimmt | 260/33.4 R |
| 3,875,140 | 4/1975 | Sheppard | 260/33.4 R |
| 3,875,262 | 4/1975 | Milne | 260/33.4 R |
| 3,893,960 | 7/1975 | Sheppard | 260/33.4 R |
| 3,900,453 | 8/1975 | Shimada et al. | 260/33.4 R |
| 3,926,899 | 12/1975 | Nordberg | 260/33.4 R |
| 4,086,202 | 4/1978 | Beck | 260/33.2 R |

FOREIGN PATENT DOCUMENTS 993794 6/1965 United Kingdom .

OTHER PUBLICATIONS

"Dispersion Poly. in Org. Media", Barrett Wiley-Inter, 1975, Chap. V.
C.A. 082-12-073858P, Enclosed Japanese Patent 49-81496.

Primary Examiner—Herbert J. Lilling
Attorney, Agent, or Firm—Michael A. Kondzella; George Jameson

[57] ABSTRACT

A non-aqueous polymeric dispersion of an acrylic or methacrylic polymer in a non-aqueous continuous phase comprised of a mixture of organic liquids, one of which is an alcohol, when applied to a suitable substrate, dries to produce a matte or low gloss coating which can be converted to a glossy coating by heating.

15 Claims, No Drawings

NON-AQUEOUS POLYMERIC DISPERSION OF ALKYL METHACRYLATE AND ALKYL ACRYLATE COPOLYMERS IN MIXTURES OF CYCLOHEXANE AND ALCOHOLS AND MATTE COATINGS PRODUCED THEREFROM

BACKGROUND OF THE INVENTION

This invention relates to matte or low glass coatings. In one of its more particular aspects this invention relates to coatings prepared from non-aqueous dispersions of acrylic polymers.

Acrylic polymers such as polymers of lower alkyl acrylates and lower alkyl methacrylates and copolymers thereof are widely used in a variety of coating applications. Aqueous emulsions of acrylic polymers dry to produce a generally glossy coating and are used in emulsion paints. Acrylics are also used in heat-resistant and fumeproof enamels and in fluorescent coatings.

SUMMARY OF THE INVENTION

Matte coatings, that is, coatings which are essentially diffusely reflecting, may be produced from non-aqueous dispersions of acrylic or methacrylic polymers in which the continuous phase is a mixture of organic liquids, one of which is an alcohol. Such coatings can be converted to high gloss coatings by heating if desired.

DESCRIPTION OF THE PREFERRED EMBODIMENT methacrylate dispersions of this invention can be prepared using a wide variety of acrylic and methacrylic polymers. For example, polymethyl methacrylate and copolymers of methyl methacrylae other lower alkyl methacrylates can be used. Especially preferred are copolymers of alkyl methacrylates and alkyl acrylates. For example, a copolymer of methy methacrylate, butyl methacrylate and butyl acrylate has been found particularly useful. Similarly, copolymers of methyl methacrylate and ethyl methacrylate or of methyl methacrylate and butyl acrylate can be used.

As the continuous phase a mixture of organic liquids, one of which is an alcohol, may be used. For example, mixtures of cyclohexane and ethanol wherein the cyclohexame and exthanol are present in a weight ratio of about 3:1 to 1:3 have been found useful in producing the desired non-aqueous dispersions of this invention. Other organic liquids and mixtures thereof including other alcohols, other cycloaliphatics of others may also be used as the continuous phase of the dispersions of the instant invention or added in small quantities to achieve desired physicochemical properties or cost advantages.

In formulating the non-aqueous dispersions which dry to produce the desired coatings of this invention, the disperse phase is incorporated into the continuous phase by simple mixing. The ratio of disperse phase to continuous phase is not critical. However, solids above about 50% content by weight the viscosity of the dispersion may become undesirably high.

The non-aqueous dispersions of this invention find wide application in the preparation of low gloss or matte coatings. For example, they can be used in low gloss fluorescent coatings, pigmented or non-pigmented low gloss coatings, furniture finishes, coatings for airplanes or automobiles, low gloss black coatings for dark rooms, optical coatings, flash-cube coatings, primers for aluminum, undercoating or overcoating for vacuum metal deposition, surface seals, non-reflecting glass, various laminates, matte finishes for signs, anti-static coatings, water repellent coatings, textured finishes, abrasion indicators, aerosols, playing cards, artificial leathers, high friction surfaces, caulking bases, photoresists, conductivity changing indicators, low gloss adhesives, decorative borders for shiny surfaces, protective layers and the like.

Some of the advantages of the dispersions of this invention are the fact that such dispersions are chemically stable and fast drying and display faster solvent release properties than normal coatings. The dispersions are capable of a high solids content at low viscosity. Upon drying the dispersions produce a uniform matte finish without pigmentation which adheres to many different types of surfaces. In particular such coatings adhere very well to metals such as aluminum.

If it is desired to convert the matte finish produced upon drying, it is merely necessary to heat the coated surface. For this purpose a low temperature bake, for example, 5 minutes at 110° C. will suffice.

Another advantage of the dispersions of this invention resides in the particular materials used in the continuous phase which generally do not attack plastics and other soluble substrates. Therefore the dispersions of this invention can be used upon relatively soluble plastics such as vinyls. Another advantage of this invention is that since the continuous phase is not a solvent for the polymers comprising the disperse phase, recoating a surface which has been coated with a dispersion of this invention is easily accomplished without crosslinking the initial coat, and clean-up is easily accomplished by the use of relatively mild solvents such as toluene.

A further advantage of the dispersions of this invention is their ease of preparation. All that is necessary is to add the disperse phase to the continuous phase and mix the two phases until the disperse phase is thoroughly dispersed within the continuous phase. No particular conditions of pressure, temperature or relative humidity are required for preparing excellent dispersions in accordance with this invention.

Another advantage of this invention is that due to the fact that the disperse phase is constituted of relatively inexpensive commercially available polymers and the continuous phase is made up of inexpensive commercially available alcohols and other organic liquids and the preparation of the dispersions involves only limited expenditures for either labor or equipment, the dispersions of this invention have a decided economic advantage over products with which they may compete.

This invention will be better understood by reference to the following examples which are intended for purposes of illustration and are not to be construed as limiting the scope of the instant invention which is defined in the claims appended hereto.

EXAMPLE 1

A mixture of 10 grams of ACRYLOID B 48N, 100%, a copolymer of methyl methacrylate, butyl methacrylate and butyl acrylate manufactured by Rohm and Haas Company, 50 grams of cyclohexane and 50 grams of denatured ethanol manufactured as Proprietary Solvent No. III (anhydrous) by U.S.I. Chemicals was mixed using a propeller mixer until the polymer was thoroughly dispersed in the liquid mixture. The continuous phase was made up of a ratio by weight by cyclohexane to ethanol of 1:1. A coating of this dispersion upon an aluminum surface dried to a uniform matte finish.

The coating aluminum surface was subjected to a 5 minute bake at 110° C. The finish was converted to a high gloss finish.

Since the foregoing description is merely illustrative, the scope of protection of the invention has been more broadly stated in the following claims, and these should be liberally interpreted so as to obtain the benefits of all equivalence to which the invention is fairly entitled.

I claim:

1. A chemically stable non-aqueous dispersion which has the property of drying to a uniform matte finish upon application to a surface which comprises a copolymer consisting of an alkyl methacrylate and an alkyl acrylate and a mixture of organic liquids including cyclohexane and an alcohol, said copolymer being the disperse phase and said mixture of organic liquids constituting the continuous phase of the non-aqueous dispersion, said mixture including substantially no solvent for said copolymer.

2. A dispersion according to claim 1 wherein the disperse phase is a copolymer of methyl methacrylate and butyl acrylate.

3. A dispersion according to claim 1 wherein the disperse phase is a copolymer of methyl methacrylate, butyl methacrylate and butyl acrylate.

4. A dispersion according to claim 1 wherein the continuous phase is a mixture of cyclohexane and ethanol in a ratio within the range of about 3:1 to 1:3.

5. A dispersion according to claim 1 wherein the continuous phase is a mixture of cyclohexane and ethanol in a weight ratio of about 1:1.

6. A matte coating produced by applying a dispersion according to claim 1 to a surface and allowing the dispersion to dry thereon.

7. A glossy coating produced by heating the coating of claim 6.

8. A dispersion according to claim 1 wherein neither the continuous phase nor the disperse phase includes effective amounts of stabilizing substances.

9. The method comprising dispersing a copolymer consisting of an alkyl methacrylate and an alkyl acrylate in a mixture of organic liquids including cyclohexane and an alcohol, to form a chemically stable, non-aqueous dispersion in which the copolymer is the disperse phase and the mixture or organic liquids is the continuous phase, said dispersion including substantially no solvent for said copolymer.

10. The method according to claim 9 wherein the disperse phase is a copolymer consisting of methyl methacrylate and butyl acrylate.

11. The method according to claim 9 wherein the disperse phase is a copolymer consisting of methyl methacrylate, butyl methacrylate and butyl acrylate.

12. The method according to claim 9 wherein the continuous phase is a mixture of cyclohexane and ethanol in a ratio within the range of about 3:1 to about 1:3.

13. The method according to claim 12 wherein the weight ratio of cyclohexane to ethanol is about 1:1.

14. The method according to claim 9 further comprising applying said dispersion to a surface and allowing the dispersion to dry thereon.

15. The method according to claim 14 further comprising heating the coating formed during the drying step of claim 14.

* * * * *